United States Patent [19]

Terada

[11] Patent Number: 5,645,662
[45] Date of Patent: Jul. 8, 1997

[54] PNEUMATIC RADIAL TIRE WITH FIRST AND SECOND DAMPING RUBBER LAYERS

[75] Inventor: Minoru Terada, Kobe, Japan

[73] Assignee: Sumitomo Rubber Industries, Ltd., Hyogo-ken, Japan

[21] Appl. No.: 557,945

[22] Filed: Nov. 14, 1995

[30] Foreign Application Priority Data

Nov. 15, 1994 [JP] Japan .................... 6-306789

[51] Int. Cl.$^6$ .................... B60C 9/00; B60C 9/08; B60C 9/14; B60C 9/18
[52] U.S. Cl. .................... 152/532; 152/537; 152/549; 152/564
[58] Field of Search .................... 152/549, 532, 152/537, 564

[56] References Cited

U.S. PATENT DOCUMENTS 3,052,275  9/1962  Hylbert, Jr. .................... 152/549 X

FOREIGN PATENT DOCUMENTS

| 0620129 | 10/1994 | European Pat. Off. . |
| 1199616 | 12/1959 | France . |
| 2400440 | 3/1979 | France . |
| 414162 | 5/1925 | Germany . |
| 1039382 | 9/1958 | Germany . |

Primary Examiner—Adrienne C. Johnstone
Attorney, Agent, or Firm—Birch, Stewart, Kolasch & Birch, LLP

[57] ABSTRACT

A pneumatic radial tire comprises a carcass comprising an outermost ply and an inner next ply, each made of organic fiber cords, a belt comprising a radially innermost ply and a radially outer next ply, each made of steel cords, a first damping rubber layer disposed between the outermost carcass ply and the inner next carcass ply, and a second damping rubber layer disposed between the outermost carcass ply and the radially innermost belt ply, the first damping rubber layer has an axial width of 0.8 to 1.2 times the axial width of the radially innermost belt ply and a thickness of 0.5 to 2.0 mm, and the second damping rubber layer has an axial width of 0.8 to 1.2 times the axial width of the radially innermost belt ply and a thickness (T2) of 0.5 to 2.0 mm, thereby the running noise is reduced without sacrificing running performance.

4 Claims, 2 Drawing Sheets

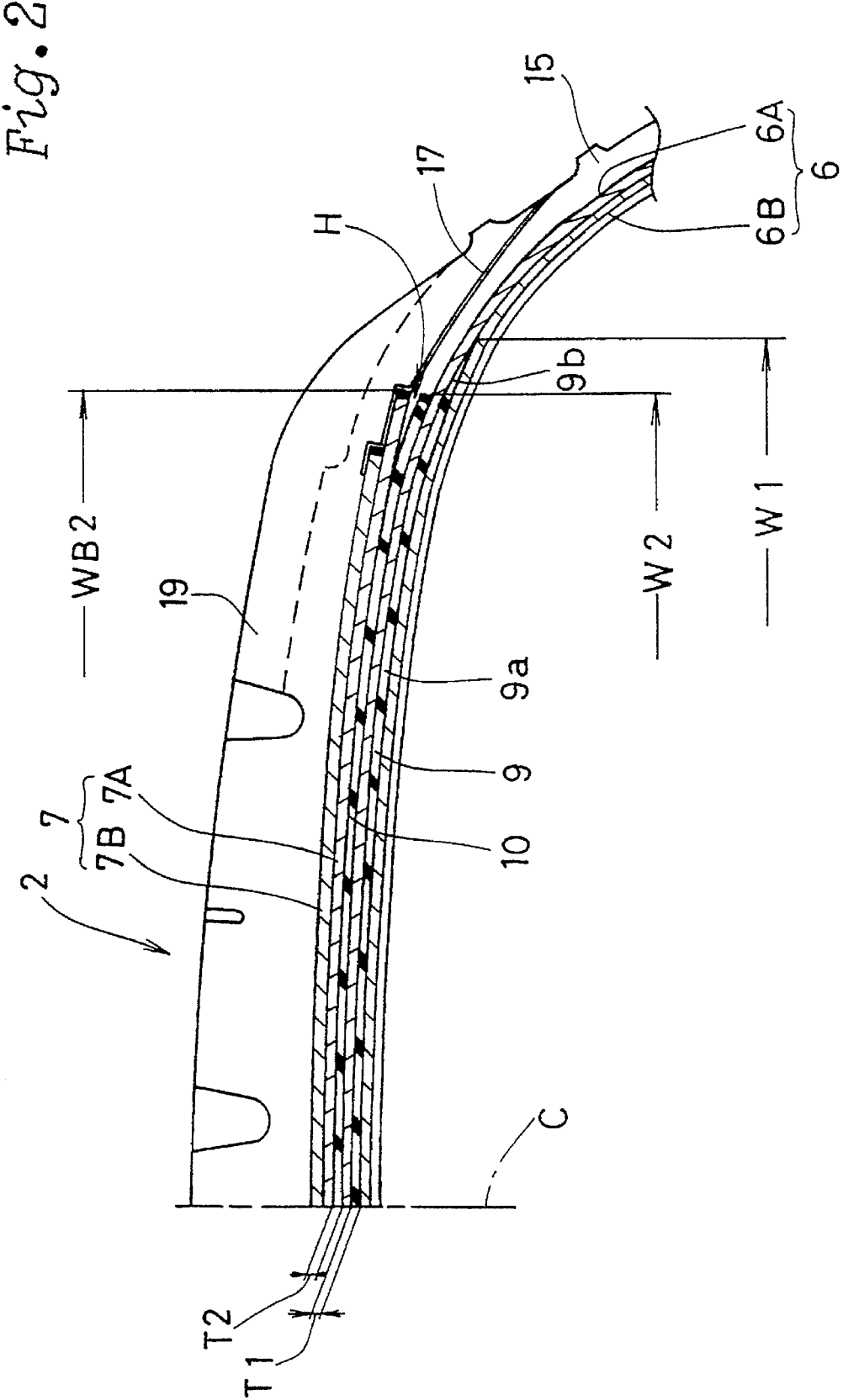

PNEUMATIC RADIAL TIRE WITH FIRST AND SECOND DAMPING RUBBER LAYERS

BACKGROUND OF THE INVENTION

1. Field of the Invention

The present invention relates to a pneumatic radial tire, more particularly an improvement in the internal structure in the tread portion which is capable of reducing noise during running without sacrificing running performance.

2. Description of Related Art

Recently, there is a great demand for a low noise tire in various categories, such as passenger tires, RV tires, 4 WD car tires and the like.

In order to reduce the running noise of a tire, many efforts have been made to improve the tread pattern especially in case of the passenger tires. However, in the case of RV tires, 4 WD car tires and the like, the tread pattern of which is defined by wide grooves and circumferentially separated tread elements such as blocks, it is difficult to reduce the running noise by improving only the tread pattern. Therefore, an attempt has been made to decrease the hardness of the tread rubber, decrease the topping rubber for the belt, and/or decrease the volume of the tread grooves.

However, when the tread rubber hardness is decreased, the cornering power decreases. As a result, the steering stability is deteriorated.

When the belt topping rubber hardness is decreased, similar problems arise because the reinforcing effect of the belt decreases.

If the tread groove volume is decreased, the wet grip performance and braking performance are deteriorated.

Such deterioration in the running performance is especially remarkable in a snow tire and mud & snow tire. Therefore, it is not preferable to employ the above-mentioned methods although the running noise of such a tire is larger than that of the passenger tires. Thus, the running noise can not be fully reduced.

The above-mentioned noise reducing methods are generally for decreasing the amplitude of the generated noise. However, even if the generated noise is reduced, or the amplitude of vibrations of the tread portion is reduced, it is liable to be amplified by resonance of the tire when transmitted from the tread portion to the sidewall portion. In the frequency range of about 1000 to 1250 Hz, such a phenomenon is remarkable, and as a result, we feel that the running noise is not reduced since the human ears are sensitive to this frequency range.

Further, if a rubber layer is disposed between the plies of a tread reinforcing belt, the running noise maybe decreases. However, as the belt stiffness decreases, the cornering power is greatly decreased, and running performance such as the steering stability is greatly deteriorated.

SUMMARY OF THE INVENTION

It is therefore, an object of the present invention to provide to a pneumatic radial tire of which the running noise is reduced without sacrificing running performance.

According to one aspect of the present invention, a pneumatic radial tire comprises a carcass comprising an outermost ply and an inner next ply, each carcass ply made of organic fiber cords and extending between bead portions through a tread portion and sidewall portions, a belt disposed radially outside the carcass in the tread portion and comprising a radially innermost ply and a radially outer next ply, each belt ply made of steel belt cords, a first damping rubber layer disposed between the outermost carcass ply and the inner next carcass ply, the first damping rubber layer having an axial width (W1) of 0.8 to 1.2 times the axial width (WB2) of the radially innermost belt ply and a thickness (T1) of 0.5 to 2.0 mm, a second damping rubber layer disposed between the outermost carcass ply and the radially innermost belt ply, the second damping rubber layer having an axial width (W2) of 0.8 to 1.2 times the axial width (WB2) of the radially innermost belt ply and a thickness (T2) of 0.5 to 2.0 mm.

Preferably, each of the first and second damping rubber layers has a JIS(A) hardness of 55 to 65 degrees, a 100% modulus of 20 to 30 kgf/sq.cm, and a loss tangent of 0.05 to 0.15.

As the second damping rubber layer is disposed between the belt and carcass, the transmission of vibration of the belt to the carcass is decreased and at the same time the vibration is absorbed.

If the vibration of the belt, which have been already damped by the second damping layer, is transmitted to the carcass crown portion, as the first damping rubber layer is disposed between the carcass plies, the vibration is again absorbed, and the transmission from the carcass crown portion to the sidewall portions is decreased.

As a result, in the frequency range of about 1000 to 1250 Hz in particular, the generation of vibrations as well as the transmission from the tread portion to the sidewall portions, are effectively decreased. As a result, the running noise in such a frequency range is effectively reduced.

According to the invention, no damping rubber layer is disposed between the belt plies. Therefore, the rigidity of the belt is maintained.

Since the rigid belt floats on the relatively soft damping layer, if the belt is vibrated, the vibrations are quickly dispersed in the circumferential direction to be absorbed by the damping layers.

Further, as the first damping rubber layer is disposed in only the crown portion, the rigidity of the carcass in the sidewall portions is not decreased.

The tread portion is therefore, reinforced by the rigid belt and the sidewall portions by the carcass. Thus, the tire as a whole is fully reinforced, and the running performance is improved.

If the JIS(A) hardness of the damping rubber layers is less than 55 degrees, it is difficult to control or absorb the belt vibration. If the hardness is more than 65 degrees, the transmission from the belt to the carcass increases and the running noise can not be reduced. Further, the tread rigidity is liable to excessively increase, which deteriorates ride comfort and increases a low frequency noise.

If the thickness of the damping rubber layers is more than 2 mm, the tread rigidity decreases and the steering stability is deteriorated. Further, the tire weight unfavorably increases, and tire uniform such as the force variation is liable to be disturbed. If the thickness is less than 0.5 mm, the above-mentioned advantages can not be obtained.

If the width W1, W2 of the damping rubber layers is less than 0.8 times the width WB2 of the radially innermost belt ply, the above-mentioned advantages can not be obtained. Further, the ground pressure distribution is liable to become uneven, which results in uneven tread wear and a decrease in the steering stability. If the width W1, W2 is more than 1.2 times the width WB2, the steering stability decreases.

Further, the tire weight increases and the tread thickness is liable to become uneven.

BRIEF DESCRIPTION OF THE DRAWINGS

An embodiment of the present invention will now be explained according to drawings.

FIG. 2 is an enlarged cross sectional view of the tread portion thereof.

DESCRIPTION OF PREFERRED EMBODIMENTS

Figure 1:
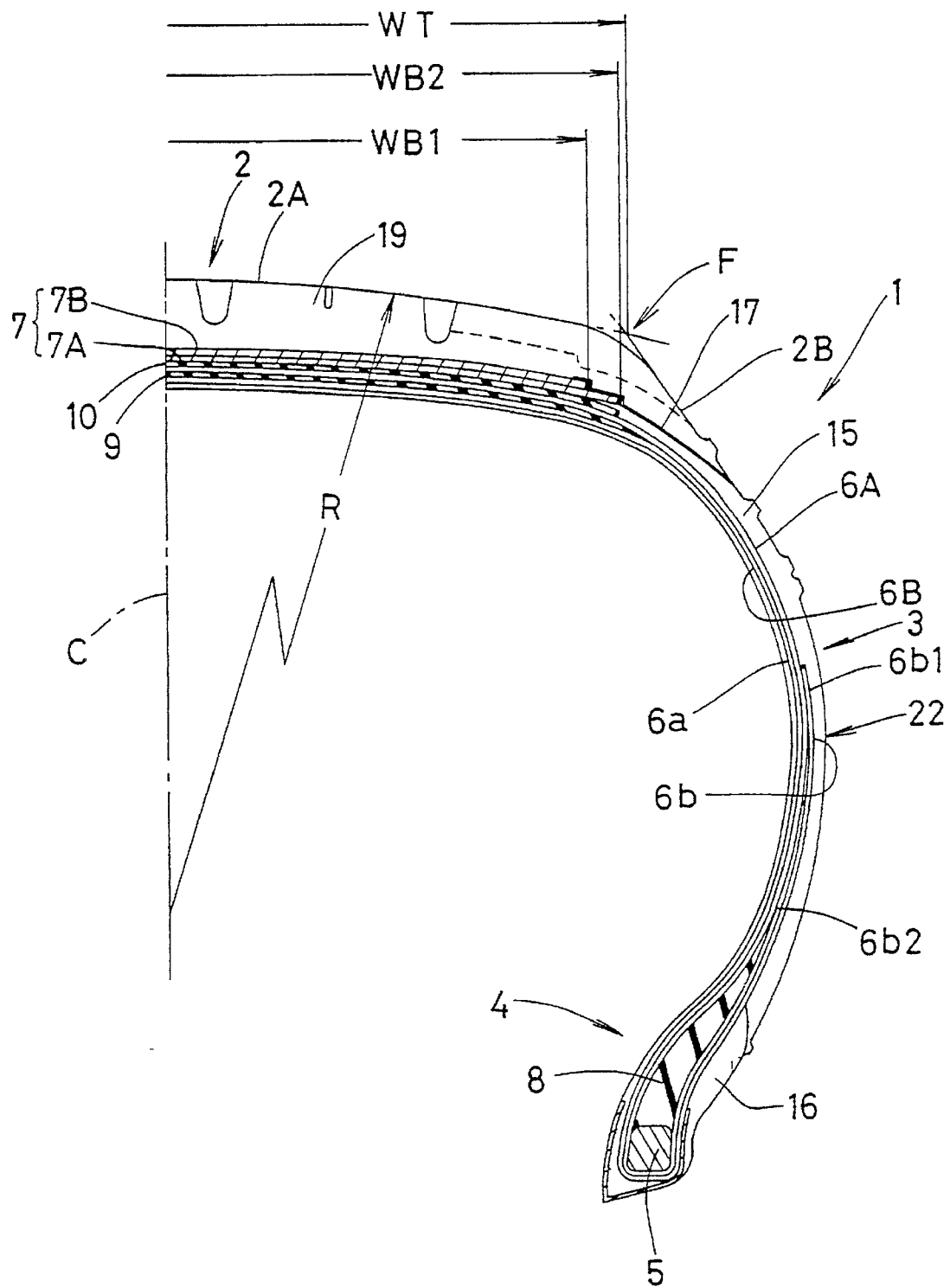
FIG. 1 is a cross sectional view of an embodiment of the present invention.

In FIG. 1, a pneumatic radial tire 1 of the present invention comprises a tread portion 2 with axial edges, a pair of axially spaced bead portions 4, a pair of sidewall portions 3 extending therebetween, a pair of bead cores 5 each disposed in each of the bead portions 3, a carcass 6 extending between the bead portions 3, and a belt 7 disposed radially outside the carcass 6 in the tread portion 2.

The carcass 6 comprises at least two plies, an outermost carcass ply 6A and an inner next carcass ply 6B. The carcass 6 in this embodiment comprises only the two plies 6A and 6B. Each of the plies 6A and 6B comprises a toroidal main portion extending from one of the bead cores 5 to the other through the sidewall portions 3 and tread portion 2, and a pair of turnup portion 6b each turned up in each bead portion 4 around the bead core 5 from the axially inside to the outside thereof.

The carcass cords in each ply 6A, 6B are radially arranged at an angle of 75 to 90 degrees with respect to the tire equator C. The carcass cords are rubberized by a topping rubber having a JIS(A) hardness of 50 to 60 degrees. For the carcass cords, organic fiber cords, e.g. nylon, rayon, polyester, aromatic polyamide and the like can be used.

The turnup portion 6b2 of the inner carcass ply 6B has an upper end which is disposed slightly, for example about 5 mm, radially inward of the maximum tire section width point 22.

The turnup portion 6b1 of the outermost carcass ply 6A extends radially outwardly beyond the upper end of the turnup portion 6b2 by a certain distance, for example about 20 mm so as to completely cover the turnup portion 6b2.

Between the main portion 6a and each turnup portion 6b of the carcass 6, a rubber bead apex 8 is disposed, the bead apex 8 extending and tapering radially outwardly from the bead core 5, so as to reinforce the bead portion 4 and sidewall lower portion in cooperation with the carcass turnup portion 6b.

The belt 7 comprises at least two plies, a radially innermost belt ply 7A and a radially outer next belt ply 7B. Each of the belt plies 7A and 7B is made of steel cords laid at an angle of 10 to 45 degrees with respect to the tire equator C and rubberized by a topping rubber having a JIS(A) hardness of 50 to 60 degrees. The belt plies 7A and 7B are oriented in different directions so that the cords in the belt ply 7A cross the cords in the belt ply 7B.

The axial width WB1 of the radially outer belt ply 7B is in the range of from 80 to 90% of the tread width WT. The axial width WB2 of the radially innermost belt ply 7A is larger than the width WB1 and in the range of from 90 to 100% of the tread width WT.

Here, the tread width WT is defined as the axial width between intersecting points F of an extension line of the tread surface line 2A and an extension line of the buttress surface line 2B. This definition is applied to a rounded shoulder tire as shown in FIG. 1. However, if the tire shoulder is edged, the tread width WT is defined as the axial width between those edges.

The tread surface 2A in this embodiment is, in the tire meridian section, defined by a single radius arc having the center on the tire equatorial plane C and a radius of curvature R of from 1.0 to 2.5 times the tire maximum width.

The tread portion 2 is, as shown in FIG. 2, provided with two damping layers 9 and 10 of a thin rubber sheet.

The first damping rubber layer 9 is disposed between the outermost carcass ply 6A and the next inner carcass ply 6B. The second damping rubber layer 10 is disposed between the outermost carcass ply 6A and the radially innermost belt ply 7A.

The first damping rubber layer 9 extends continuously between its axial edges, and the axial width W1 between the edges is in the range of from 0.8 to 1.2 times the above-mentioned belt ply width WB2. Each edge portion thereof is tapered so as to avoid stress concentration of the carcass plies on the point corresponding to the edge. This tapered edge portion 9b has a width of not more than 0.1 times, preferably not more than 0.06 times, the overall width W1. The main portion defined between the tapered edge portions 9b has a substantially constant thickness T1 of from 0.5 to 2.0 mm, more preferably from 0.8 to 1.2 mm.

The second damping rubber layer 10 has a substantially constant thickness T2 of from 0.5 to 2.0 mm, more preferably 0.8 to 1.2 mm, over the substantially overall width thereof. The axial width W2 thereof is in the range of from 0.8 to 1.2 times the above-mentioned width WB2.

In this embodiment, the width W2 is less than the width W1, which is substantially equal to the width of the main portion 9a of the first damping rubber layer 9.

In the figures, the edge portions are not tapered, but it is also possible to taper the edges as the first damping rubber layer.

The first and second damping rubber layers 9 and 10 are made of a rubber compound harder than the carcass rubber and the belt topping rubber. The JIS(A) hardness thereof is in the range of from 55 to 65 degrees, but 3 to 15 degree larger than that of the topping rubber.

Preferably, the first and second damping rubber layers 9 and 10 have a loss tangent or loss factor of from 0.05 to 0.15, and a 100% modulus (M100) of from 20 to 30 kgf/sq.cm. If these limitations are not satisfied, a separation damage from the carcass 6 and belt 7 is liable to occur and the tread durability decreases.

The loss tangent and complex elastic modulus (E*) are measured in the following conditions, a temperature of 70 degrees C., initial strain of 10%, frequency of 10 Hz and amplitude of 2%, using a viscoelastic spectrometer manufactured by Iwamoto Seisakusho in Japan.

The above-mentioned damping rubber layers 9 and 10 are formed by winding a thin rubber sheet and jointing the circumferential edges thereof usually by slightly overlapping one another. The joint part of the first damping rubber layer 9 is disposed at a circumferentially different position from that of the second damping rubber layer 10, for example, 180 degrees differed so as to improve the force variation.

In each sidewall portion 3, a sidewall rubber 15 is disposed on the axially outside of the carcass 6, the hardness of which is less than that of the second damping rubber layer 10. The radially inner and outer edges of the sidewall rubber 15 are tapered, and the inner edge is overlapped and connected with a tapered radially outer edge of a bead rubber 16, the bead rubber 16 extending radially outwardly from the bead heel. The outer edge is also overlapped and connected with a tapered axial edge of a tread rubber 19 using a thin bonding layer 17 disposed therebetween. The bonding layer 17 is made of a rubber compound having a hardness between those of the tread rubber 19 and sidewall rubber 16. One end of the bonding layer 17 reaches to the tire surface, and the other end to the radially outside of the radially outermost belt ply so as to cover all the belt ply edges. The radially outer edge of the sidewall rubber 15 is inserted into a space H between the axial edge of the second damping rubber layer 10 and the axial edge of the the belt 7, in this embodiment that of of the widest innermost belt ply 7A.

In this embodiment, the same rubber compound is used for the first and second damping rubber layers 9 and 10, which is usually preferable for the tire uniformity. It is however, possible to use different rubber compounds.

An example of the rubber compound which satisfies the above-mentioned limitations for the JIS(A) hardness, loss tangent and 100% modulus is as follows.

|  | (parts by weight) |
| --- | --- |
| NR | 75.00 |
| SBR | 25.00 |
| Carbon black (HAF) | 45.00 |
| Aromatic oil | 9.00 |
| Stearic acid | 2.00 |
| Hydrozincite | 5.00 |
| Mineral oil | 0.75 |
| Sulfur | 3.00 |
| Accelerator | 1.50 |
| JIS(A) hardness | 60 deg. |
| Loss tangent | 0.09 |
| Complex elastic modulus | 48 kgf/sq. cm |
| 100% modulus (M100) | 23 kgf/sq. cm |
| 300% modulus (M300) | 110 kgf/sq. cm |

Test tires of size 265/70R16 having the same structure shown in FIG. 1 except the damping layers were made and tested for the passing noise, steering stability and rolling resistance. The specifications and test results are shown in Table 1.

1) Passing noise

According to the "Test Procedure for Tire Noise" specified in Japanese JASO-C606, a four-wheel-drive car provided with test tires was coasted for 50 meter distance at a speed of 57 km/h in a straight test course, and the maximum noise sound level in dB(A) was measured with a microphone set at 1.2 meter height from the road surface and 7.5 meter sideways from the running center line in the midpoint of the course.

2) Steering stability

During running the test car, it was evaluated by the driver's feeling the results are indicated by an index based on that the conventional tire is 100.

3) Rolling resistance

The tire was mounted on a standard rim and inflated to 1.9 kg/sq.cm, and the rolling resistance was measured at a running speed of 80 km/H under a tire load of 275 kg, using a drum type tire rolling resistance tester with a drum diameter of 1707.6 mm. The results are indicated by an index based on that the conventional tire is 100. The smaller the value, the smaller the rolling resistance.

It was confirmed from the tests that, in comparison with the conventional tire, the example tires were reduced in the maximum passing noise sound level while substantially maintaining the steering stability.

As described above, in the pneumatic radial tire according to the present invention, as the two damper layers are disposed the passing noise an be reduced without sacrificing running performance such as the steering stability and the like.

The present invention is suitably applied to a snow tire, mud & snow tire, and 4 WD vehicle tire.

TABLE 1

| Tire | Conven. | Ref. 1 | Ex. 1 | Ex. 2 | Ex. 3 | Ref. 2 |
| --- | --- | --- | --- | --- | --- | --- |
| First damping layer |  |  |  |  |  |  |
| Thickness T1(mm) | — | — | 1.0 | 1.0 | 0.5 | — |
| Width W1 (× WB2) | — | — | 1.0 | 1.0 | 1.0 | — |
| Second damping rubber |  |  |  |  |  |  |
| Thickness T2(mm) | — | 2.0 | 1.0 | 2.0 | 0.5 | 3.0 |
| Width W2 (× WB2) | — | 1.0 | 1.0 | 1.0 | 1.0 | 1.0 |
| Passing noise |  |  |  |  |  |  |
| 1000 Hz dB(A) | 58.98 |  | 57.94 |  |  |  |
| 1250 Hz dB(A) | 58.36 |  | 57.36 |  |  |  |
| Overall dB(A) | 71.4 | 69.9 | 70.0 | 69.7 | 70.3 | 69.8 |
| Steering stability | 100 | 90 | 100 | 90 | 100 | 85 |
| Rolling resistance | 100 | 98 | 100 | 98 | 100 | 95 |

I claim:

1. A pneumatic radial tire comprising a carcass comprising an outermost ply and an inner next ply, each carcass ply made of organic fiber cords and extending between bead portions through a tread portion and sidewall portions, a belt disposed radially outside the carcass in the tread portion and comprising a radially innermost ply and a radially outer next ply, each belt ply made of steel belt cords, a first damping rubber layer disposed between the outermost carcass ply and the inner next carcass ply, the first damping rubber layer having an axial width of 0.8 to 1.2 times the axial width of the radially innermost belt ply and a thickness of 0.5 to 2.0 mm, and a second damping rubber layer disposed between the outermost carcass ply and the radially innermost belt ply, the second damping rubber layer having an axial width of 0.8 to 1.2 times the axial width of the radially innermost belt ply and a thickness of 0.5 to 2.0 mm.

2. The pneumatic radial tire according to claim 1, wherein each of the first and second damping rubber layers has a JIS A hardness of 55 to 65 degrees, a 100% modulus of 20 to 30 kgf/sq.cm, and a loss tangent of 0.05 to 0.15, wherein the loss tangent is measured at a temperature of 70° C., an initial strain of 10%, a frequency of 10 hertz, and an amplitude of 2% using a viscoelastic spectrometer.

3. The pneumatical radial tire according to claim 1, wherein the first damping rubber layer has a thickness of 0.8 to 1.2 mm.

4. The pneumatical radial tire according to claim 1, wherein the second damping rubber layer has a thickness of 0.8 to 1.2 mm.

* * * * *